Patented Dec. 24, 1929

1,740,801

UNITED STATES PATENT OFFICE

GEORG WOLFSLEBEN, OF LUDWIGSHAFEN-ON-THE-RHINE, GERMANY, ASSIGNOR TO GENERAL ANILINE WORKS, INC., OF NEW YORK, N. Y., A CORPORATION OF DELAWARE

PRODUCTION OF BLACK TRISAZO DYESTUFFS

No Drawing. Application filed September 1, 1927, Serial No. 217,020, and in Germany September 6, 1926.

I have found that a black trisazo dyestuff with highly valuable properties may be obtained when the aminoazo body, p-aminobenzene-azo-2-amino-8-naphthol-6-sulfonic acid, prepared by acid coupling, is diazotized, then coupled in alkaline medium with 2-amino-8-naphthol-6-sulfonic acid, the resulting disazo dyestuff being diazotized again and coupled with m-phenylenediamine in an alkaline medium.

The dyestuff so obtained which probably corresponds to the formula

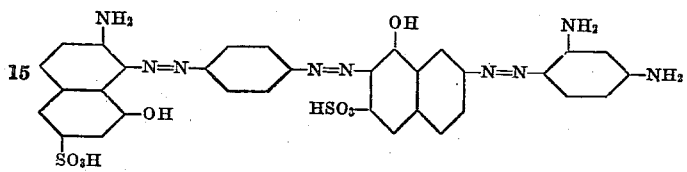

gives pure black dyeings, possessing excellent properties as regards fastness, on cotton and artificial silks, except on acetate silk. By reason of it having no tinctorial action at all on acetate silk, valuable color effects may be obtained by its use on mixed fabrics consisting of acetate silk, on the one hand, and other artificial silks, or cotton, or both, on the other hand.

Valuable dyestuffs are also obtained when an additional sulfonic acid group is present in the dyestuff obtained as hereinbefore-mentioned. This sulfonic acid group may enter either into one of the two 2-amino-8-naphthol-6-sulfonic acid radicals, or into the m- or p-phenylene-diamine radicals.

These dyestuffs give also valuable black dyeings on cotton and viscose silk, and when used for dyeing mixed fabrics containing acetate silk, leave the latter perfectly white.

The following examples will further illustrate the nature of the said invention which however is not limited thereto. The parts are by weight.

Example 1

A diazo solution prepared from 13.8 parts of p-nitraniline, 29 parts of hydrochloric acid, 20° Beaumé, and 6.9 parts of sodium nitrite, is added to a suspension of 24 parts of 2-amino-8-naphthol-6-sulfonic acid, the coupling mixture being stirred until the formation of the dyestuff is complete.

After the addition of 12 parts of sodium carbonate, the nitro group of the resulting dyestuff is reduced with 12.8 parts of 100 per cent sodium sulphide. The resulting aminoazo body is precipitated by salting-out, and after being dissolved in water is treated with 6.9 parts of sodium nitrite, the mixture being then run into a mixture of 43 parts of 20° Beaumé hydrochloric acid, ice and water. When the diazotization is completed, the diazo solution is introduced into a strongly cooled solution of 23.9 parts of 2-amino-8-naphthol-6-sulfonic acid and 32 parts of sodium carbonate. The coupling will be complete at the end of several hours.

The disazo dyestuff is precipitated with common salt, pressed and then made up into an aqueous suspension, mixed with the proper amount of sodium nitrite, ascertained, in advance, by titration, and diazotized by allowing it to run into a mixture of 43 parts of 20° Beaumé hydrochloric acid, water and ice, and stirring for from 2 to 3 hours.

The diazo compound is now introduced into a solution of 10 parts of industrial m-phenylenediamine and 24 parts of sodium carbonate, the mixture being stirred for from 10 to 12 hours, then warmed to from 50° to 60° C., pressed and dried.

When ground, the dyestuff forms a black bronze-colored powder, which is satisfactorily soluble in water. It gives deep black dyeings on cotton, and on artificial silks with the exception of acetate silk. When it is employed for dyeing mixed fabrics of cotton and acetate silk, or of acetate silk and other artificial silks, the acetate silk is left perfectly white.

Example 2

The p-aminoazo, body, p-phenylenediamine-azo-2-amino-8-naphthol-6-sulfonic acid, obtained according to Example 1 and further diazotized, is allowed to run into a strongly cooled solution of 31.9 parts of 2-amino-8-hydroxynaphthalene-3.6-disulfonic acid and 34 parts of sodium carbonate. The coupling will be complete at the end of several hours.

The salted-out and pressed disazo dyestuff is suspended in water and treated with the proper amount of sodium nitrite, ascertained, in advance, by titration, and allowed to run into a mixture of 45 parts of 20° Beaumé hydrochloric acid, water and ice. After stirring for from 2 to 3 hours at from 0° to 2° C., the diazo solution is introduced into a solution of 10 parts of m-phenylenediamine and 26 parts of sodium carbonate and, after stirring for from 10 to 12 hours, is pressed and dried.

When ground, the dyestuff forms a black bronze-colored powder which is very readily soluble in water. It gives deep black dyeings on cotton and artificial silks with the exception of acetate silk. When used for dyeing mixed fabrics of cotton and acetate silk, or of acetate silk and other artificial silks, the acetate silk remains perfectly white.

What I claim is:

1. As new article of manufacture, black trisazo dyestuffs which probably correspond to the formula

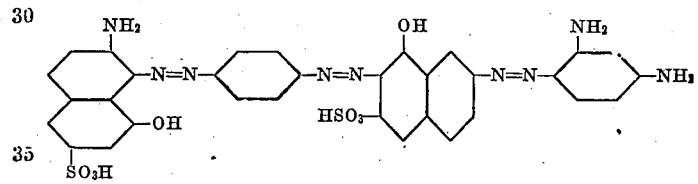

and which may contain a further sulfonic acid group.

2. The process of producing a black trisazo dyestuff which consists in diazotizing p-aminobenzene-azo-2-amino-8-naphthol - 6 - sulfonic acid, prepared by acid coupling with 2-amino-8-naphthol-6-sulfonic acid in alkaline medium, diazotizing again and coupling with m-phenylenediamine in an alkali medium.

3. The process of producing a black trisazodyestuff which consists in diazotizing p-amino - benzene-azo-2-amino - 8 - naphthol-6-sulfonic acid prepared by acid coupling, coupling with 2 - amino-8-naphthol-6-sulfonic acid in alkaline medium, diazotizing again and coupling with m-phenylenediamine in an alkali medium, in which process one of the said components may contain a further sulfonic acid group.

In testimony whereof I have hereunto set my hand.

GEORG WOLFSLEBEN.

CERTIFICATE OF CORRECTION.

Patent No. 1,740,801.  Granted December 24, 1929, to

GEORG WOLFSLEBEN.

It is hereby certified that error appears in the printed specification of the above numbered patent requiring correction as follows: Page 2, line 42, claim 2, after the word "coupling" insert a comma and the word ", coupling"; and that the said Letters Patent should be read with this correction therein that the same may conform to the record of the case in the Patent Office.

Signed and sealed this 4th day of February, A. D. 1930.

(Seal)

M. J. Moore,
Acting Commissioner of Patents.